United States Patent [19]

Krofta

[11] Patent Number: 5,242,585
[45] Date of Patent: Sep. 7, 1993

[54] APPARATUS AND METHOD FOR DEINKING WASTE PAPER PULP

[75] Inventor: Milos Krofta, Lenox, Mass.

[73] Assignee: Lenox Institute for Research, Inc., Lenox, Mass.

[21] Appl. No.: 755,028

[22] Filed: Sep. 4, 1991

[51] Int. Cl.⁵ .............................................. B03D 1/24
[52] U.S. Cl. ................................. 210/188; 210/195.1;
   210/197; 210/221.2; 210/538; 209/170; 162/4;
   96/177
[58] Field of Search .................... 209/170; 210/221.2,
   210/926, 220, 512.1, 221.1, 195.1, 197, 188, 538;
   96/177; 162/5, 4

[56] References Cited

U.S. PATENT DOCUMENTS

| | | |
|---|---|---|
| 2,248,177 | 7/1941 | Karlstrom . |
| 3,452,870 | 7/1969 | Katsuta ............................. 209/170 |
| 3,495,712 | 2/1970 | Schreiber ......................... 210/220 |
| 3,642,617 | 2/1972 | Brink et al. . |
| 3,769,207 | 10/1973 | Baer . |
| 3,986,954 | 10/1976 | George ............................. 210/196 |
| 4,022,696 | 5/1977 | Krofta . |
| 4,146,478 | 3/1979 | Rongved ........................... 210/926 |
| 4,151,093 | 4/1979 | Krofta . |
| 4,157,952 | 6/1979 | Krofta . |
| 4,184,967 | 1/1980 | Krofta ............................... 209/170 |
| 4,186,094 | 1/1980 | Hellberg .......................... 209/170 |
| 4,331,534 | 5/1982 | Barnscheidt ..................... 209/170 |
| 4,377,485 | 3/1983 | Krofta . |
| 4,399,028 | 8/1983 | Kile .................................. 209/170 |
| 4,512,888 | 4/1985 | Flynn ............................... 209/170 |
| 4,512,895 | 4/1985 | Reid ................................. 210/926 |
| 4,620,926 | 11/1986 | Linck ................................ 209/170 |
| 4,622,132 | 11/1986 | Chupka ........................... 210/512.1 |
| 4,626,345 | 12/1986 | Krofta . |
| 4,721,562 | 1/1988 | Barnscheidt ..................... 209/170 |
| 4,722,784 | 2/1988 | Barnscheidt ................... 210/221.2 |
| 5,022,984 | 6/1991 | Pimley ........................... 210/221.2 |
| 5,028,315 | 7/1991 | Cruea ............................... 210/703 |
| 5,069,751 | 12/1991 | Chomblee ........................ 210/703 |

FOREIGN PATENT DOCUMENTS 115971 3/1946 Sweden .

Primary Examiner—Thomas M. Lithgow
Attorney, Agent, or Firm—Dike, Bronstein, Roberts & Cushman

[57] ABSTRACT

An apparatus and method for de-inking waste paper pulp using a foam flotation process to recycle printed waste paper for the manufacture of new paper. Pulped printed paper is fed as a slurry to an inlet of a shallow tank. Internal guide walls in the tank establish a flow path from the inlet to an outlet. The walls are sized and positioned to create a generally uniform cross-sectional flow area. A plurality of modules are disposed along the flow path. Each module includes at least one injector that aerates the flow and an extractor that removes floated ink foam. A portion of the flow from each module is recycled to an upstream module, preferably by a conduit and associated pump. In a preferred form, an injector (or injectors) alone located at the inlet is fed by the next downstream module and an extractor alone is located near the outlet. The invention also includes a main recycling loop from the downstream end of the flow path to the upstream end. This main recycling loop has a large flow rate compared to the recycled flow between the modules.

11 Claims, 2 Drawing Sheets

APPARATUS AND METHOD FOR DEINKING WASTE PAPER PULP

BACKGROUND OF THE INVENTION

This invention relates in general to the manufacture of paper, and more specifically to an improved process for removing ink from a slurry of pulped waste paper using a foam flotation technique to produce new paper.

Economies of manufacture and the conservation of natural resources has generated interest in the manufacture of paper from recycled stock, where paper previously printed is pulped to create a slurry that is fed to a paper-making machine. Printing inks must be removed from the slurry to produce new paper of the appropriate brightness.

Various techniques for removing the printing inks are known, but the present invention relates to the froth or foam flotation process where defibered paper is mixed with preheated water and chemicals including alkalis, collectors and foamers. This treated raw slurry is directed to a tank where it is aerated with microscopic bubbles stabilized by a flotation agent or agents. As the bubbles rise in the tank through the slurry the ink pigments adhere to the bubbles and are carried to the surface of the tank where they form a foam or froth. The foam is skimmed away or otherwise removed, and the deinked slurry is treated further, e.g. by processing in a stockwasher described in applicant's U.S. Pat. No. 4,151,093. Dirty outlet water from the stockwasher can be cleaned in a clarifier of the type described in applicant's U.S. Pat. Nos. 4,022,696; 4,377,485; or 4,626,345 and used in the paper-making process or returned to a water supply such as a river or lake.

U.S. Pat. No. 4,157,952 to applicant discloses a prior art foam flotation deinker. A slurry of 1% pulped waste paper is introduced into a cylindrical tank by a nozzle positioned in the tank, under water, and near the upper, outer edge of the tank. The nozzle is pointed downwardly at 30° to 60° and ejects a flow tangent to the outer tank wall to set up a swirling flow within the tank. The nozzle includes internal restrictions and an air line located after one set of restriction to draw air into the slurry. The flow into the nozzle is pressurized at 10-20 psi. A baffle extends generally radially across the upper surface of the tank. After almost one rotation within the tank, the swirling floated sludge strikes the baffle. A vacuum foam inlet at the baffle removes the accumulated foam and directs it to a vacuum tank where the air bubbles burst and the ink residue collects, and is discharged.

While this '952 deinker works well as compared to the prior art foam flotation apparatus described in this '952 patent, it is presently the component that limits the speed of the pulp treatment line feeding the paper-making machine. If the throughput rate is increased, the new paper quality will be adversely affected. The difficulty of meeting the necessary production capacity conventional equipment has, at least in part, caused some paper mills to close their operations.

The straightforward expedient of using a larger diameter tank does not solve the problem. While the capacity of a foam flotation de-inker increases with the available surface area, current production requirements require a prohibitively large tank in terms of size, weight, capital cost, and energy usage to operate it. Larger tanks are also, in general, associated with a longer retention time which is not conducive to efficient operation.

It is therefore a principal object of the present invention to provide an improved foam flotation apparatus and method with a larger capacity than heretofore possible.

A further object is to provide an improved apparatus and method which has a low weight and does not require special reinforcement to support it.

Yet another object is to provide a method and apparatus with the foregoing advantages which is also efficient both in terms of deinking and power consumption.

A further object is to provide an apparatus and process for deinking pulped waste paper which is modular in construction to tailor capacity and power consumption to a specific application.

A still further object is to provide the foregoing advantages using comparatively uncomplicated apparatus and techniques that can be implemented at a favorable capital cost.

Another object of the invention is to provide a deinker apparatus and method with the foregoing advantages which can treat pulped waste paper at a rate and efficiency sufficient to keep up with other modern pulp processing equipment and to protect the environment from the discharge of contaminants.

SUMMARY OF THE INVENTION

A deinking apparatus treats a slurry of pulped waste paper that flows into a tank through a main inlet, preferably located at an outer wall of the tank. The slurry is treated chemically so that the ink separated from the paper fibers, adheres to microscopic air bubbles added to the slurry, and float upwardly to form a foam at the surface of the slurry moving through the tank. De-inked slurry exits an outlet, preferably near the center of the tank and including an inner tank wall portion of adjustable height to provide a spill over exit. A vacuum source, preferably at the center of the tank draws the foam to itself where the bubbles burst and the ink collects for discharge.

The improved deinker of the present invention includes guide walls within the tank to form a continuous flow path of generally uniform cross-sectional flow area from the inlet to the outlet. The path preferably simulates a spiral; it is preferably formed from sets of concentric sections with different centers of curvature. Modules formed of aerating injectors and/or floated foam extractors are arrayed along the flow path. Sets of conduits and pumps provide multiple flow recycling along the path from one downstream module to the injector of an upstream module. The injector introduces air into the recycled flow and produces a pressurized output directed along the flow path.

Preferably each injector is supplied recycled slurry from an outlet in the region of the immediately following, downstream module. A half module (only an injector) is used at the upstream end of the flow path and a half module (an extractor only) is used at the extreme downstream end. Each extractor comprises a conduit with openings to receive the floated foam and is in fluid communication with the vacuum source. A main recycling loop takes a larger flow from the extreme downstream end of the flow path to the extreme upstream end on a continual basis.

Viewed as a method, the invention features an improved foam flotation inking process conducted in a tank where the slurry is directed through the tank in a flow path of generally constant cross-sectional area, and preferably spiraling inwardly to an adjustable overflow outlet. It also includes recycling the flow at a plurality of locations along the path and introducing aerated water at multiple points along the path each fed by one of these recycled flows. The improved process also includes a main recycling of the flow from the region of the outlet to the region of the inlet.

These and other features and objects of the present invention will be more readily understood from the following detailed description which should be read in light of the accompanying drawings.

DETAILED DESCRIPTION OF THE PREFERRED EMBODIMENTS

Figure 1:
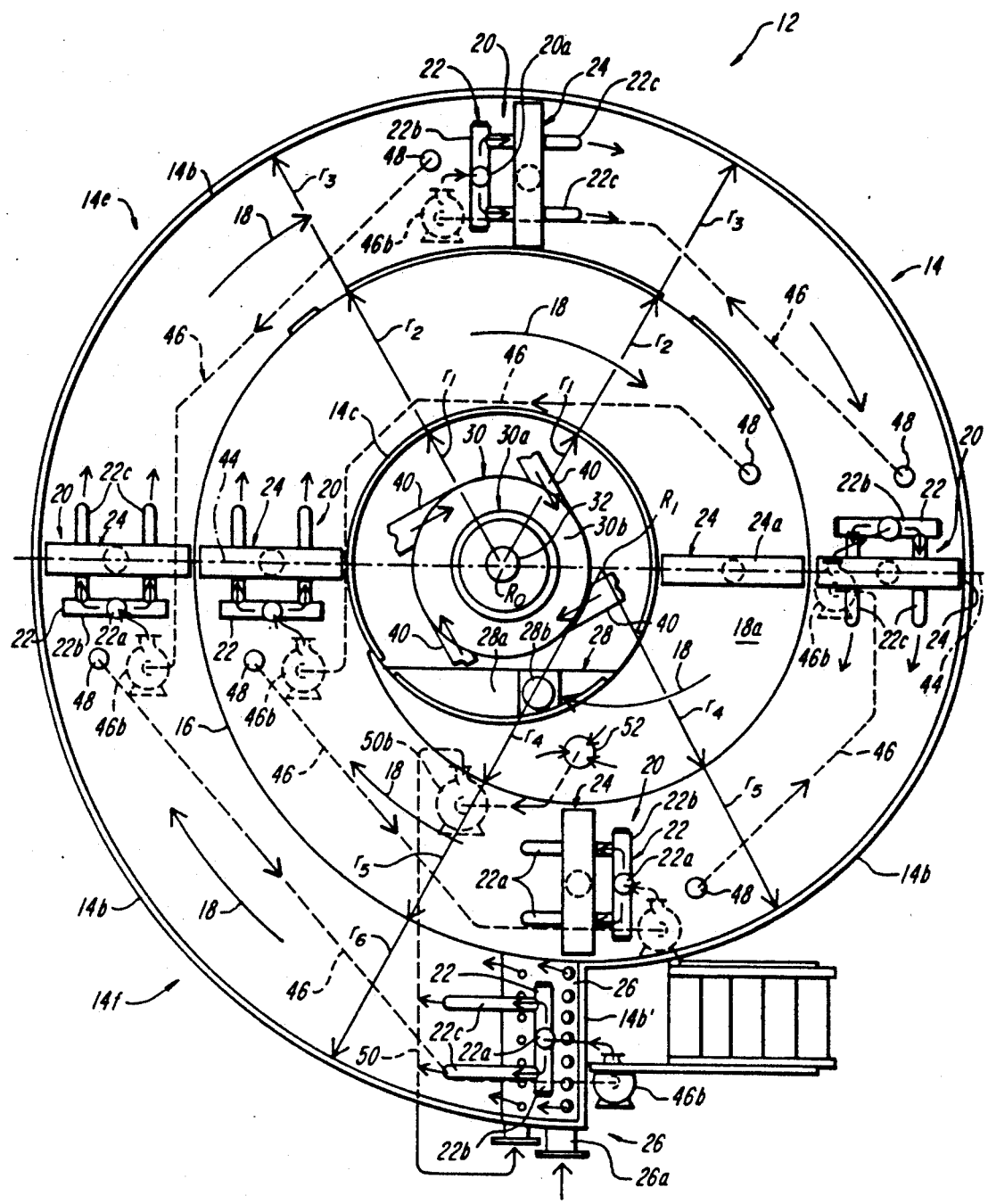
FIG. 1 is a top plan view of an improved de inking apparatus according to the present invention utilizing a spiral-like flow path, five full modules and two half modules.
Figure 2:
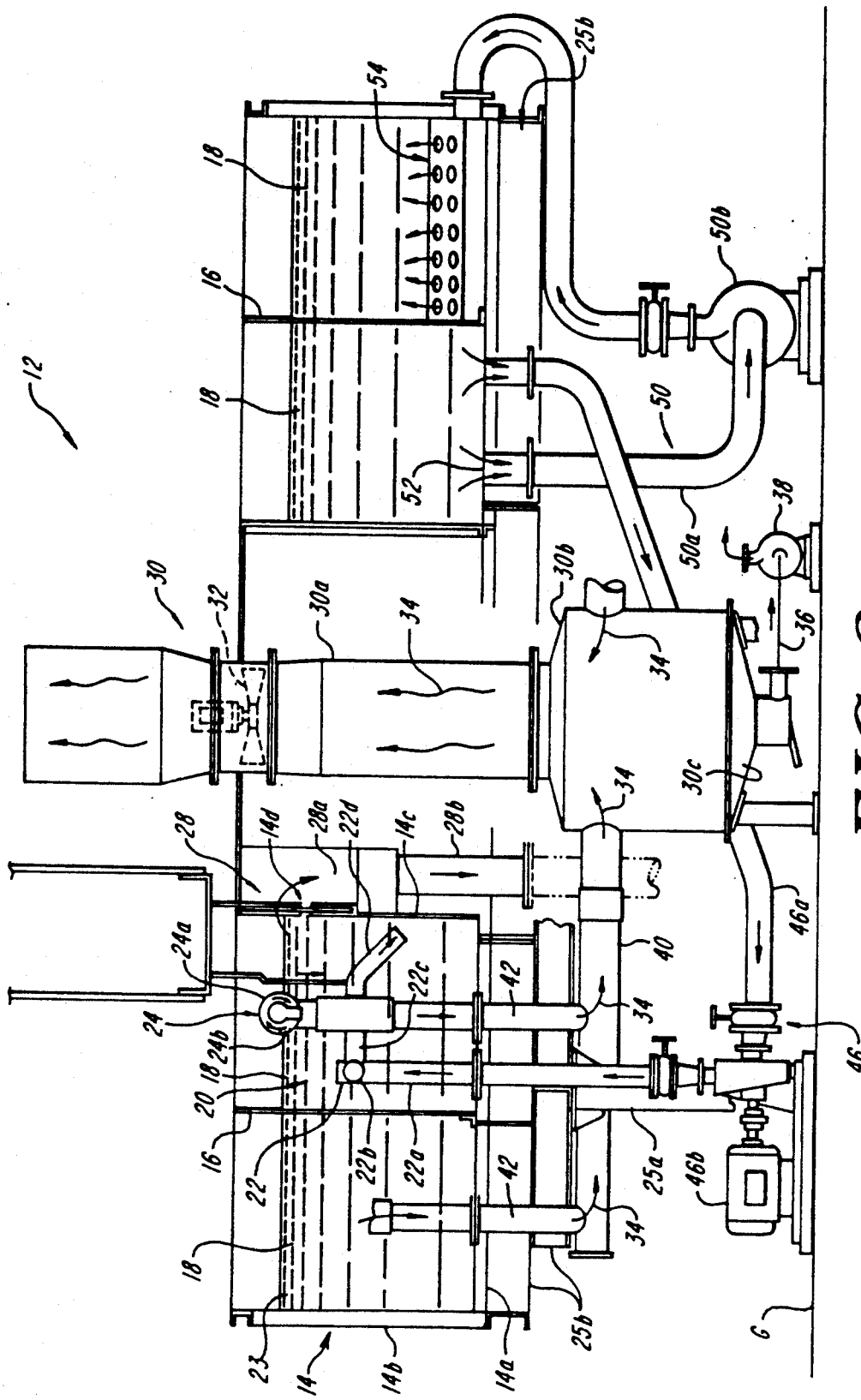
FIG. 2 is a view in vertical section and partly in side elevation of the apparatus shown in FIG. 1 taken along the line 2—2.

FIGS. 1 and 2 show an improved de-inking apparatus 12 that includes a tank 14, internal guide walls 16 forming a spiral-like flow path 18 of generally uniform cross sectional area, and a set of modules 20 with injectors 22 to introduce a pressurized flow of recycled aerated slurry 23 to the flow path and extractors 24 to draw away ink bearing foam floated to the surface of the slurry in the tank. The tank 14 has a bottom wall 14a, an outer wall 14b and an inner wall 14c. A slurry of pulped waste paper with a dry content of about 1% enters the tank via an inlet 26 that includes an inlet pipe 26a and a manifold 26b with a plurality of openings that distribute the inflow generally uniformly across the flow path. Deinked slurry exits the tank 14 via an outlet 28 that includes a portion 14d of the inner tank wall 14c where the slurry spills over into a compartment 28a feeding an exit conduit 28b. The tank and its vertical walls 14b, 14c and 16 are formed from any suitable structural material such as steel.

A foam cyclone 30 located at the center of the tank 14 has a fan 32 that produces an air flow 34 and associated air pressure drop within the cyclone. The fan 32 is located in a generally vertically oriented conduit 30a connected to a central chamber 30b. A concave bottom wall 30c collects ink carried on the foam and released when the microscopic air bubbles forming the foam burst, whether due to the pressure drop at the chamber 30b, or the mechanical action of the fan blades on the air bubbles. Collected ink is removed by the line 36 and a self-priming pump 38.

The suction produced by the fan 32 is distributed by a set of radially extending conduits 40 and vertically oriented branch conduits 42 to each extractor 24 via the central chamber 30b. Each extractor, in turn, is formed by a generally tubular member 24a oriented generally horizontally along the surface of the slurry. A set of mutually spaced openings 24b formed in the member 24a are positioned to draw floated foam into the member 24a while blocking, at least in part, an inflow of the slurry. A tube 24c is mounted concentrically within the tube 24a so that any foam passing into extractor 24 must rise over the upper surface of the tube 24c before it ca reach the conduit 42, as shown in FIG. 1. This ensures that only the floated, ink-bearing foam is drawn from the surface of the slurry to the cyclone.

The tank 14 is preferably shallow with a typically slurry height of 0.6 to 1.5 meter. This height is sufficient to allow the foam flotation process to separate the ink from the fibers in the slurry with a high degree of effectiveness while not using such a large volume of water in the tank that there are structural problems associated with supporting the mass of the filled tank. The shallow depth also reduces the mass of water to be moved along the flow path 18 and therefore reduces the power requirements of the apparatus. Because the bottom wall 14a is substantially flat, the cross sectional area of the flow path is determined by the inner and outer walls 14b and 14c and the interior guide walls 16. The tank as shown is supported over a floor or ground G by structural beams 25a and 25b.

A principal feature of the present invention is that the walls 14b, 14c and 16 define a flow path of generally uniform cross-sectional area, for a given diameter tank. The flow path extends as one continuous path through the tank 14 between the space defined by the outer wall 14b and the inner wall 14c. While this path can assume various configurations, in the preferred form illustrated it spirals. The uniform cross-sectional along the flow path area is important to reduce resistance to the flow and avoid turbulence that interferes with the flotation process.

This spiral flow path is preferably formed in modular sections of the vertical walls 14b, 14c and 16 to provide a modular construction that allows the flow path length and size of the tank 14 to be tailored to a particular installation. More specifically, the tank 14 can be divided along a diameter 44 into an upper sections 14e, as shown, and a lower section 14f. Each section has its own characteristic center of curvature $R_0$ and $R_1$, respectively, for its defining vertical walls. Those walls are arrayed as concentric rings at radii $r_1$, $r_2$, $r_3$, $r_4$, $r_5$ and $r_6$ as shown in FIG. 1. The only portion of the flow path which does not have a constant cross-sectional area is the final section 18a defined by the inner wall 14c, the inner most portion of the interior wall 16 and the most downstream extractor 24.

As is evident from FIG. 1, the "upper" tank section 14e is centered on $R_0$ which is the physical center of the tank 14. The inner wall 14c is at the radius $r_1$ centered on $R_0$. The interior wall 16 is at the radius $r_2$ which is twice the value of $r_1$. The outer wall is at radius $r_3$ which is three times the value of $r_1$. The section 14f is centered on $R_1$ which is offset by a distance $\frac{1}{2} r_1$ from $R_0$ along the diameter 44. The value of $r_4$ swung around $R_1$ sets the position of the interior wall 16 in the tank section 14f, beginning at the wall 16 in the section 14e and terminating at the inner wall 14c. The radius $r_5$ centered on $R_1$ determines the outer wall portion from the downstream end of the section 14e to a radial portion 14b of the outer wall at the inlet 26. The radius $r_6$, also centered on $R_1$, defines the outer wall portion in the section 14f from the inlet to the first full module 20 in the flow path. As will be readily appreciated by those skilled in the art, this mode of constructing the constant flow area spiral-like path of this invention allows one to tailor the path length by using wall sections of circular curvature, although of varying radii, which are less expensive to manufacture and assemble than wall sections of a more complex, non circular geometry. Also, this mode of construction allows one to select the location of the inlet and its associated wall section 14b' to provide a flow path of a desired length.

Another principal feature of this invention is that there are multiple full modules 20 positioned along the flow path and there are multiple slurry recycle lines 46 associated with this array of modules. This arrangement provides a continuous recycling of a portion of the slurry flowing along the path 18 from a region adjacent a downstream module to the injector 22 of an upstream module. Preferably the modules are spaced generally uniformly from one another and arrayed serially along the flow path. As shown, they are arrayed equiangularly along at least one complete revolution of the flow path (with the linear path length varying due to variations in the radius of the path).

At the beginning of the flow path adjacent the inlet 26 there is a half module consisting of an injector 22, but no extractor. This injector 22, and the injectors 22 associated with each full module 20, have an inlet conduit 22a that extends generally vertically upwards into the tank 14, a radial manifold 22b in fluid communication with the inlet conduit 22a, and a pair of outlet nozzles 22c,22c. The nozzles 22c,22c are parallel, directed generally along the flow path 18, and have an end portion angled downwardly at an angle of 30° to 60° from the horizontal. Each injector aspirates air into the flow of slurry ejected from its nozzles 22c,22c. The aspiration is by any of a variety of known arrangements such as (i) drawing in air as through an air line that feeds to a region in the nozzle following a Venturi restriction in the slurry flow path as in the apparatus of U.S. Pat. No. 4,157,952, or alternatively, (ii) by adding compressed air to the slurry being fed to the injector using any of a variety of well known techniques used to dissolve compressed air in water to form microscopic air bubbles.

Each injector is fed by one of the lines 46 which is formed by a conduit 46a and an associated pump 46b. The pump 46b generates a pressure in the slurry as a stream from the nozzles 22c,22c. Each conduit 46 receives a module to module recycle flow of slurry fed through a port 48 in the bottom tank wall 14a in the region of a downstream module, and preferably the immediately adjacent downstream module. The port 48 is also preferably slightly upstream of the associated module so that it draws only slurry that has traversed the flow path segment from the immediately upstream injector to the port. The recycle flow in the lines 46 is a fraction of the total flow such that the total flow in all of the lines 46 between modules is roughly 20% of the total flow, although the precise value will vary depending on factors such as the number of modules, flow rate, and the operating conditions and requirements. The region adjacent first full module 20 feeds the "half" module consisting of the injector 22 at the inlet 26; the region adjacent the "half" module consisting of the final extractor 24 alone feeds the last full module 20. Because of this array of modules and the use of module to-module recycling flows it is possible to achieve a high degree of deinking utilizing a tank having a small size as compared to prior art tanks with comparable operating characteristics.

The present invention also includes a main recycle flow line 50 fed from an outlet port 52 in the tank bottom wall 14a at the downstream end 18a of the flow path. As with the module to module recycle lines, the main recycle line includes a conduit 50a and an associated pump 50b. The line 50 feeds the recycled flow back to the extreme upstream end of the flow path via an inlet manifold 54 adjacent the main inlet manifold 26b for the unprocessed slurry. The flow rate for the main recycle line is preferably about one fourth the flow rate through the apparatus 12 along the path 18. In any event, it is preferably at least double the module to module flow rate.

Viewed as a process, the present invention includes introducing a slurry of pulped printed paper into a shallow, generally cylindrical tank 14. The slurry is introduced at one area, preferably adjacent the outer tank wall 14b, and directed tangentially to set up a generally circular flow within the tank. The withdrawing of the deinked water is adjustable to set varying water depths in the tank. The withdrawing is also done in a manner to retain the floated foam carrying the ink removed from the pulped paper fibers within the tank.

A principal characteristic of the process of this invention is that the slurry in the tank circulates through the tank along a mechanically well-defined flow path 18 that has a substantially constant cross-sectional area, except for the end of the path at the point where the deinked water is withdrawn. The flow path is preferably spiral-like and formed in modular radial sections.

Another principal characterizing feature of the process of the present invention is that the flow of slurry along this flow path is recycled, both along the path between the modules 20 and along the entire path. The recycling includes injecting an aerated flow of slurry into the tank at a series of locations along the flow path. The slurry is fed to each point of injection from a point downstream. The process also includes extracting the floated foam from the tank. The recycling can include an initial injecting at the beginning of the flow path with no extracting and a final extracting with no injecting. The extracting preferably includes a suction removal of the floated foam to a vacuum source 30 where the air bubbles carrying the foam burst to release the ink, and the points of extraction are preferably arrayed along the flow path with the points of injection, except for an initial injection at the beginning of the flow path. The recycling flow between modules is a fraction of the main recycling flow from the end of the flow path back to its beginning.

By way of illustration but not of limitation, to process a throughput flow of 3,500 gallons (U.S.) per minute (gpm) of slurry, the tank 14 has an outer diameter of about forty feet operating at a depth of about 1 meter (approximately three feet) with a wall to wall flow path width of about 1 meter. Five full modules 20 and two half modules are located in the flow path, as shown. Each module-to-module recycle flow is about 100 gpm and the main recycle flow is about 500 gpm. The retention time is about 10 minutes with a slurry having a 1% consistency. Such a forty foot diameter tank can process 125 tons of bone dry stock per day. Assuming about a 25% loss in ink, clay and fines that are removed at the deinker, stockwasher and clarifiers, this unit can produce about 100 tons per day of finished material to a paper making machine.

There has been described a improved apparatus and process for removing ink from pulped paper fibers which can operate on a larger throughput of slurry than heretofore feasible with equipment that is of comparable size and weight. The apparatus and method of this invention provide this increased operating capacity with no diminution of the deinking efficiency and with a favorable power consumption. The apparatus is also modular to allow it to be readily tailored to the needs of a particular installation. The deinking apparatus and method disclosed herein is able to keep up with the capacity of other components commonly used in waste pulp treatment such as stockwashers and clarifiers.

While the invention has been described with respect to its preferred embodiments, it will be understood that various modifications and alterations will occur to those skilled in the art. For example, while the invention has been described with respect to a spiral like flow path, it is possible to achieve some of the benefits of this invention from a single or multiple circular flow path or paths. Also, while the invention has been described with respect to modules where injectors are closely coupled with an extractor, these components can be spatially separated to a larger degree, provided that there is the requisite slurry recycling and foam removal. Further, while the flow path is described as spiraling inwardly, it is possible to have it spiral outwardly. These and other modifications and variations are intended to fall within the scope of the appended claims.

What is claimed is:

1. Deinker for removing ink from a slurry of pulped, previously printed waste paper using the foam flotation process where the ink is separated from paper fibers and floated upwardly on microscopic air bubbles comprising, a tank having a bottom wall and a generally cylindrical outer wall, guide means fixed in said flow tank defining an extended flow path through the tank of generally uniform cross-sectional flow area, a main inlet means to said tank located at an upstream end of the flow path for feeding the waste paper slurry to the tank, and an outlet means from the tank at a downstream end of the flow path for removing de-inked slurry from the tank, a plurality of modules disposed along said flow path in a mutually spaced relationship, wherein each module includes at least one of (i) an injector means that introduces a flow of aerated slurry to the flow path under pressure and directed generally along said flow path and (ii) means for extracting foamed ink from the surface of the slurry flowing along said flow path through the tank, and wherein at least one module, which is not the most downstream module, includes said injector means and wherein at least one other module has said means for extracting foamed ink from the surface of the slurry flowing along said flow path in said tank, first means for recycling a portion of the water moving along said flow path having at least one inlet adjacent an associated module and directing said portion from said at least one inlet to an injector means of another one of said modules located upstream of said associated module.

2. The deinker of claim 1 wherein said outlet means includes an outlet conduit for the de-inked slurry located at the center of the tank and an inner tank wall with at least a portion of said inner tank wall having means to adjust said inner tank wall height to control the level of the water held in said tank.

3. The deinker of claim 1 wherein said first recycling means directs said portion of said slurry flow between immediately adjacent ones of said modules spaced along said flow path.

4. The deinker of claim 1 wherein said guide means is structured to define a flow path that is generally in the form of a spiral.

5. The deinker of claim 4 wherein said guide means is formed in modular sections of concentric semi-circular side walls, said guide means in half of said tank being formed with modular sections having a radius of curvature centered on the tank and said guide means in the other half of said tank being formed with modular sections centered on a radius of curvature offset from the center of said tank.

6. The deinker of claim 1 wherein the most upstream module includes only said injector means and is located adjacent said main inlet means.

7. The deinker of claim 1 wherein the most downstream module includes only said extractor means and is located adjacent said outlet means.

8. The deinker of claim 1 further comprising second means for recycling a second portion of said flow from the extreme downstream end of said flow path to the extreme upstream end.

9. The deinker of claim 8 wherein said second recycling means comprises conduits means and an associated pump.

10. The deinker of claim 1 further comprising means for creating a vacuum and means for connecting said vacuum creating means to the extracting means of each of said modules having said extracting means whereby the foamed ink is drawn by said vacuum from said extracting means to said vacuum creating means where the microscopic air bubbles are burst to collect the ink removed from the slurry.

11. The deinker of claim 10 wherein the slurry in the flow path defines an upper surface and wherein said extracting means comprises a conduit located adjacent the surface of said flow, with openings sized and positioned to receive said foamed ink into the conduit.

* * * * *